(12) United States Patent
Dickie et al.

(10) Patent No.: US 6,234,507 B1
(45) Date of Patent: *May 22, 2001

(54) SUSPENSION SYSTEM FOR A WHEELCHAIR

(75) Inventors: Paul C. Dickie, Clovis; Robert A. Taylor, Fresno, both of CA (US)

(73) Assignee: Sunrise Medical HHG Inc., Longmont, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 09/551,691

(22) Filed: Apr. 18, 2000

Related U.S. Application Data

(63) Continuation of application No. 09/134,286, filed on Aug. 14, 1998, now Pat. No. 6,070,898.

(51) Int. Cl.[7] .................................................. B60G 5/04
(52) U.S. Cl. ........................ 280/304.1; 280/124.169; 180/65.1; 180/907; 267/279
(58) Field of Search .................................. 267/276, 279, 267/153, 141.2; 280/250.1, 304.1, 755, 124.1, 124.166, 124.169; 180/65.1, 907

(56) References Cited

U.S. PATENT DOCUMENTS

| Re. 28,259 | 12/1974 | Henschen . |
|---|---|---|
| D. 380,991 | 7/1997 | Deming . |
| 3,601,424 | 8/1971 | Badland et al. . |
| 4,128,137 | 12/1978 | Booth . |
| 4,436,320 | 3/1984 | Brudermann et al. . |
| 4,513,832 | 4/1985 | Engman . |
| 4,817,928 * | 4/1989 | Paton .................................. 267/219 |
| 4,900,055 | 2/1990 | Wright . |
| 5,435,404 | 7/1995 | Garin, III . |
| 5,531,284 | 7/1996 | Okamoto . |
| 5,575,348 | 11/1996 | Goertzen et al. . |
| 5,848,658 | 12/1998 | Pulver . |
| 5,851,013 | 12/1998 | Gill et al. . |
| 5,855,387 | 1/1999 | Gill et al. . |
| 5,944,131 | 8/1999 | Schaffner et al. . |
| 5,964,473 | 10/1999 | Degonda et al. . |
| 5,996,716 | 12/1999 | Montiglio et al. . |
| 6,041,876 * | 3/2000 | Pulver et al. ........................ 180/65.1 |
| 6,070,898 * | 3/2000 | Dickie et al. ....................... 280/304.1 |

FOREIGN PATENT DOCUMENTS 0 908 165 A2    4/1999    (EP) .

* cited by examiner

*Primary Examiner*—Brian L Johnson
*Assistant Examiner*—Avraham H. Lerner
(74) *Attorney, Agent, or Firm*—MacMillan, Sobanski & Todd, LLC

(57) ABSTRACT

A wheelchair suspension system includes suspension members that interact to cause a positive movement of the suspension members to urge the drive wheels into contact with the ground. The resilient suspension system comprises a drive wheel suspension member for supporting a drive wheel and a front wheel suspension member for supporting a front wheel. The drive wheel suspension member and the front wheel suspension member are each adapted to be movably attached to the wheelchair frame. Each suspension member cooperates with a resilient element to resist movement of the suspension members relative to the frame. The suspension members are adapted to cooperate with each other in response to movement of the suspension members relative to the frame to urge the drive wheel into contact with the ground.

17 Claims, 10 Drawing Sheets

SUSPENSION SYSTEM FOR A WHEELCHAIR

CROSS-REFERENCE TO RELATED APPLICATION

The application is a continuation copending U.S. patent application Ser. No. 09/134,286, filed on Aug. 14, 1998 now U.S. Pat. No. 6,070,898.

BACKGROUND OF THE INVENTION

This invention relates in general to wheelchair suspension systems and more particularly, to resilient independent suspension members that have the ability to interact with one another to improve drive wheel traction.

Conventional wheelchairs include side frames and a seat assembly supported by the side frames. Drive wheels and front casters are attached to the side frame. The drive wheels may be driven by the wheelchair occupant or by an electrical motor. Anti-tip wheels are often provided rearward of the drive wheels. The anti-tip wheels are adapted to engage the ground to prevent the wheelchair from tipping over.

The drive wheels, casters, and anti-tip wheels of traditional wheelchairs are rigidly attached to the side frames. Rigidly attached wheels and casters typically fail to maintain contact with the ground as the wheelchair negotiates obstacles or irregular ground surfaces. Moreover, such wheels and casters provide an abrupt jolt to the wheelchair occupant as the wheels and casters engage the ground.

To overcome this problem, pivotal suspension members have been provided for supporting the wheels and casters. Such suspension members are adapted to pivot about a common transverse axis to permit the wheels to maintain contact with the ground. The suspension members may be spring-biased to absorb shock and provide greater comfort for the wheelchair occupant. In addition to absorbing shock, the spring-biased suspension members further insure that substantially all the wheels and casters maintain contact with the ground. Some suspension members provide variable rate resistance to movement. The resistance progressively increases as the suspension members move. The rate of resistance may increase non-linearly. It is well known to use elastomeric elements to bias suspension members. The elastomeric elements cooperate with the frame and suspension members to resist rotational movement of the suspension members.

While the advancements in suspension members have progressed towards maintaining ground contact, such advancements have limited application. Maintaining ground contact is still a problem when negotiating obstacles or irregular ground surfaces because of the passive movement of the suspension members. The passive movement has a limited effect on improving the traction of the drive wheels.

What is needed is a wheelchair suspension system that has suspension members interacting to positively urge the drive wheel suspension members into contact with the ground and thus improve the traction of the drive wheels.

SUMMARY OF THE INVENTION

This invention is directed towards a wheelchair suspension system that includes suspension members that interact to cause a positive movement of the suspension members to urge the drive wheels into contact with the ground. The resilient suspension system comprises a drive wheel suspension member for supporting a drive wheel and a front wheel suspension member for supporting a front wheel. The drive wheel suspension member and the front wheel suspension member are each adapted to be movably attached to the wheelchair frame. Each said suspension member cooperates with a resilient element to resist movement of the suspension members relative to the frame. The suspension members are adapted to cooperate with each other in response to movement of said suspension members relative to the frame to urge the drive wheel into contact with the ground.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
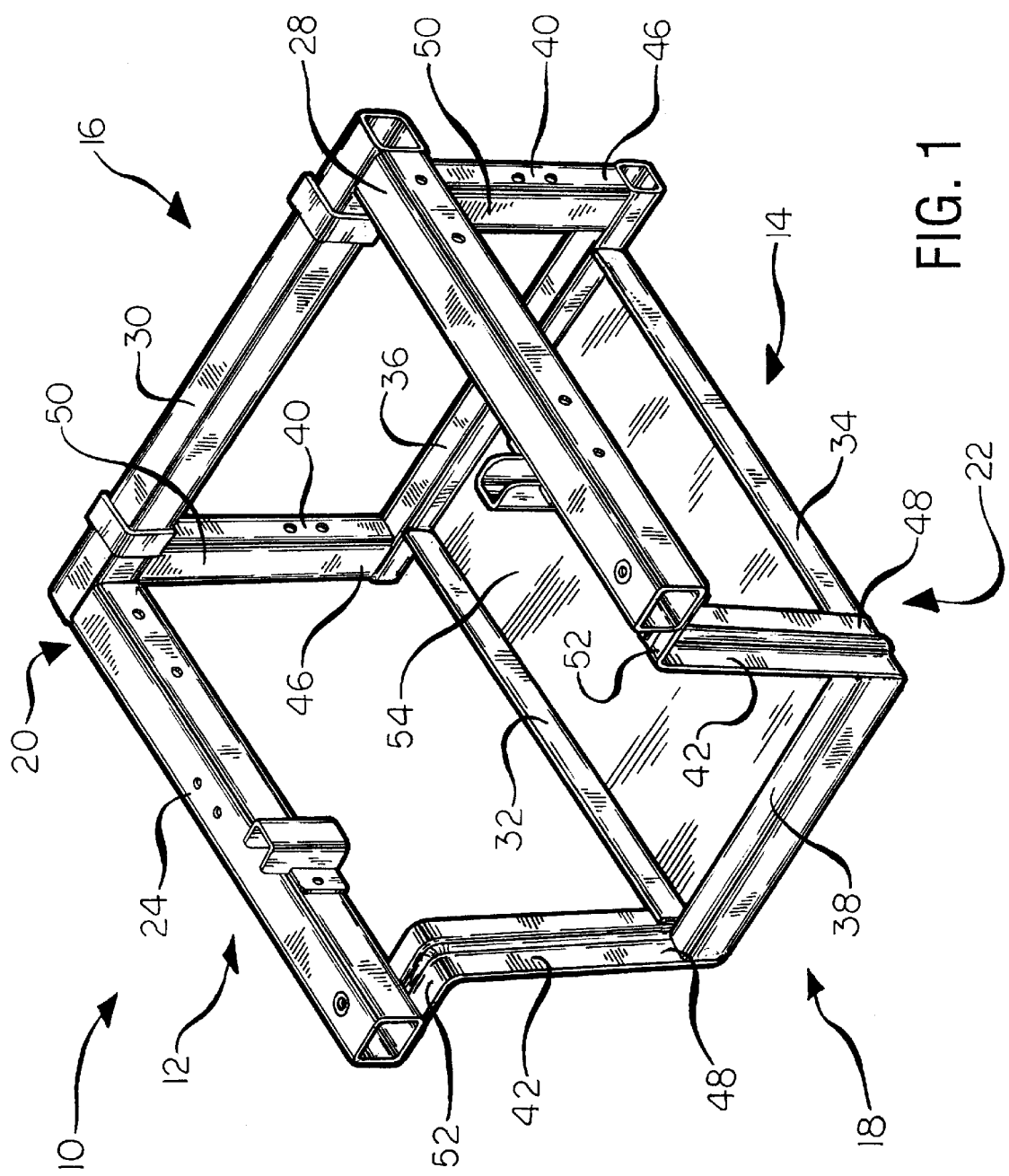
FIG. 1 is a rear perspective view of a base frame assembly for use with a wheelchair suspension system according to the invention.

Referring now to the drawings, there is illustrated in FIG. 1 a power wheelchair base frame assembly 10 for supporting a wheelchair seat assembly (not shown). It should be understood that the base frame assembly 10 could be adapted to support any number of suitable wheelchair seat assemblies. It should also be understood that a wheelchair seat assembly could be attached to the base frame assembly 10 in any suitable manner.

The base frame assembly 10 has opposite sides 12, 14, a front end 16, and a rear end 18. A footrest 26 (shown in FIG. 2) extends from the front end 16 of the base frame assembly 10. The base frame assembly 10 further includes an upper frame structure 20 and a lower frame structure 22. The upper frame structure 20 includes opposite sides 24, 28 and a front end 30. The lower frame structure 22 includes opposite sides 32, 34, a front end 36, and a rear end 38. The upper frame structure 20 is spaced apart from the lower frame structure 22 and fixed relative to the lower frame structure 22 by vertically extending structural elements 40, 42. The vertically extending structural elements 40, 42 have lower ends 46, 48 connected to corners of the lower frame structure 22 and upper ends 50, 52 connected to corners of the upper frame structure 20. This configuration forms a base frame assembly 10 having a substantially rectangular construction. A substantially planar panel 54 is rigidly connected to the opposite sides 32, 34, the front end 36, and the rear end 38 of the lower frame structure 22 so as to be rigidly supported by the lower frame structure 22. The planar panel 54 is provided to support a battery (not shown). It should be understood that this base frame assembly 10 described is for merely illustrative purposes and that the invention may be adapted for use with other wheelchair frame assemblies.

Figure 2:
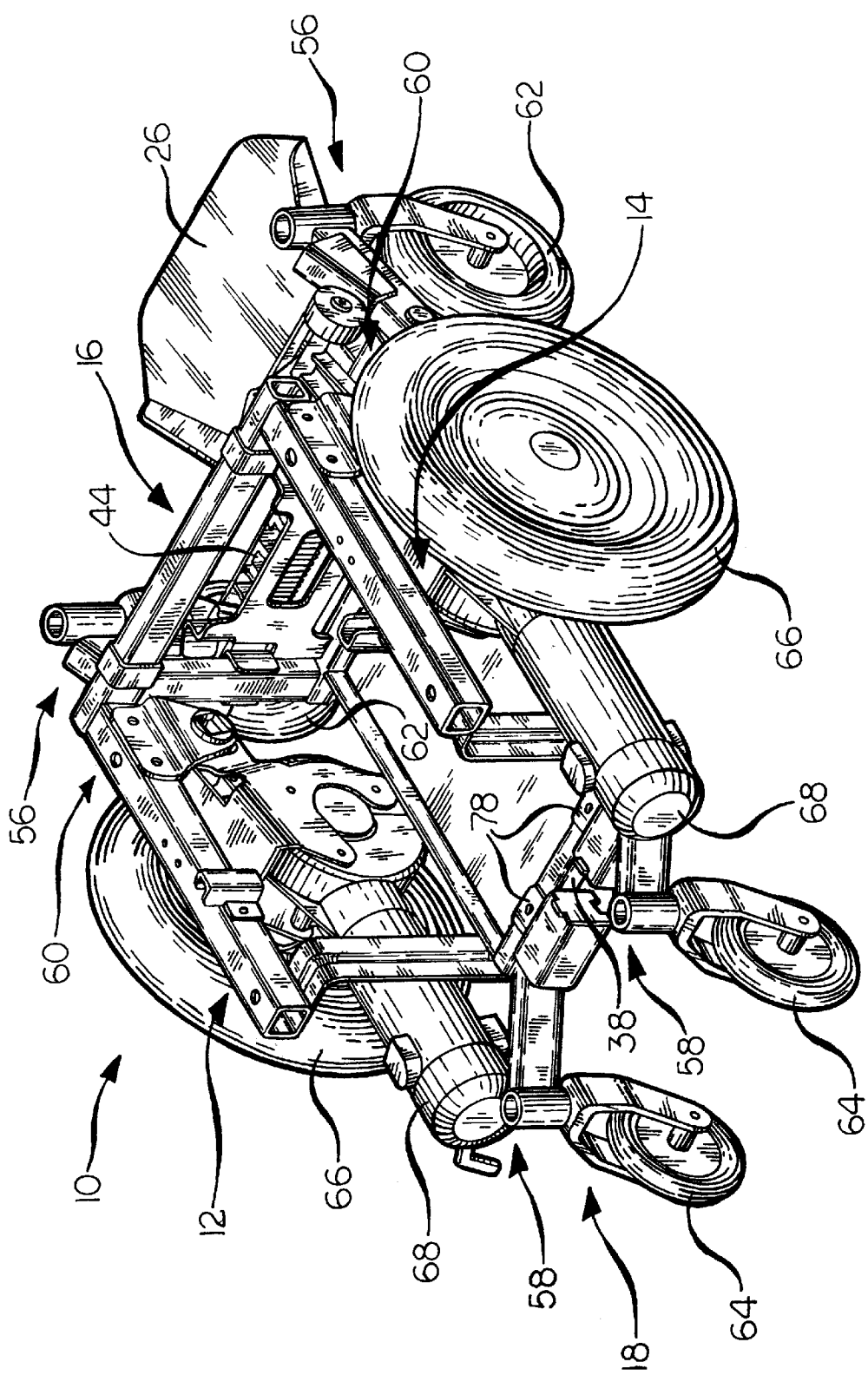
FIG. 2 is a rear perspective view of the base frame assembly shown in FIG. 1, further showing resilient suspension members attached to the base frame assembly for supporting drive wheels and drive motors, front casters, and anti-tip wheels.
Figure 7:
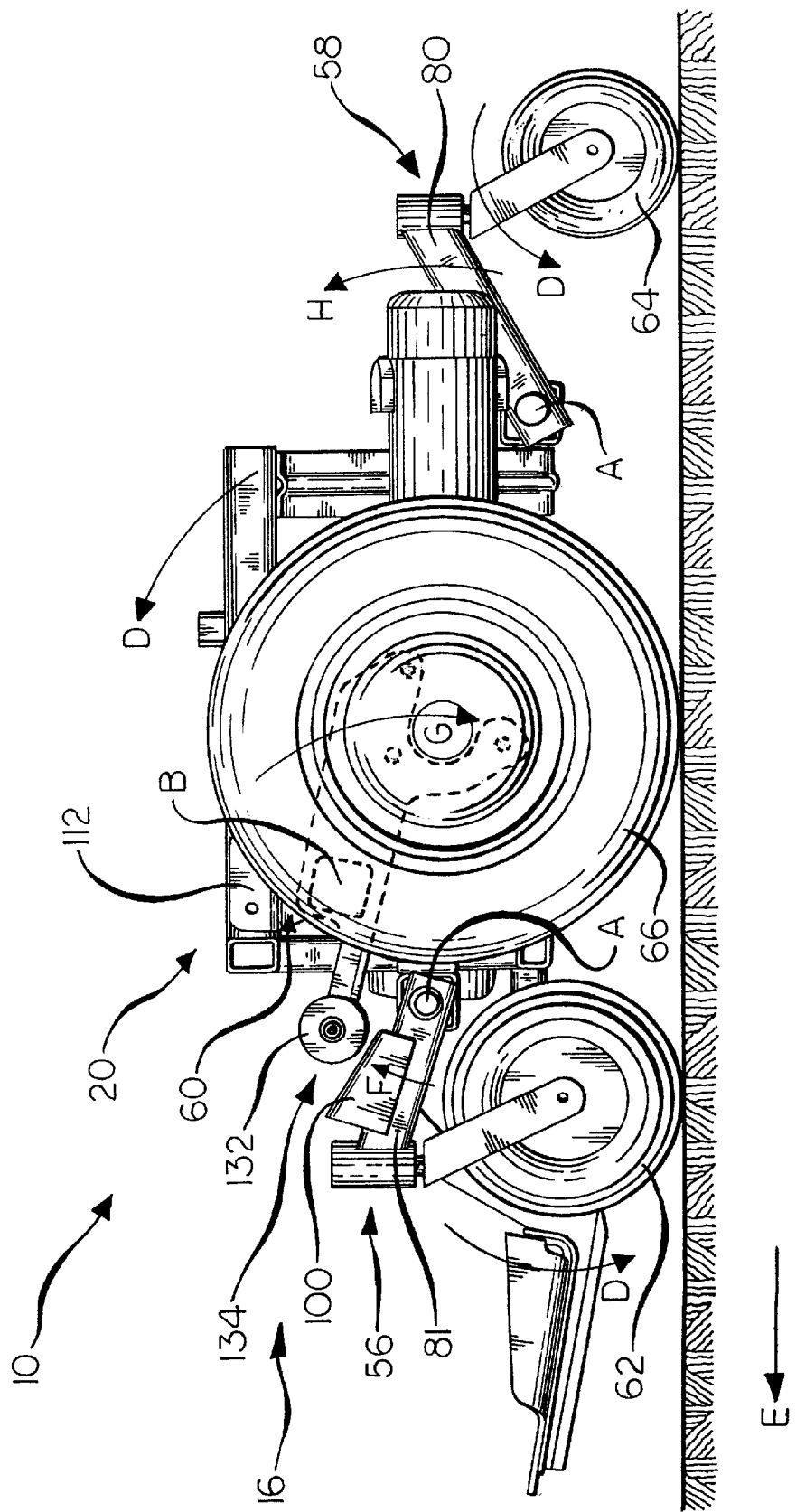
FIG. 7 is an elevational view of the base frame assembly showing relative locations of the resilient drive wheel suspension member, the resilient front suspension member, and the resilient rear suspension member.

As shown in FIG. 2, the base frame assembly 10 supports independent resilient suspension members, generally indicated at 56, 58 and 60 (shown more clearly in FIG. 7). The independent resilient suspension members include resilient front suspension members 56, resilient rear suspension members 58, and resilient drive wheel suspension members 60. The resilient drive wheel suspension members 60 are attached to opposite sides 12, 14 of the base frame assembly 10. The resilient front suspension members 56 are attached to the base frame assembly 10 in front of the drive wheel suspension members 60. The resilient rear suspension members 58 are attached to the base frame assembly 10 reward of the resilient drive wheel suspension members 60.

Each of the resilient suspension members 56, 58, 60 supports a wheel. For example, each of the resilient front suspension members 56 supports a front wheel 62. The front wheels 62 are preferably casters. Each of the resilient rear suspension members 58 supports a rear wheel 64. The rear wheels 64 may also be casters. Lastly, each of the resilient drive wheel suspension members 60 supports a drive wheel 66. The drive wheels 66 are preferably driven by a prime mover, such as the electric motor assembly 68 shown. The electric motor assembly 68 may be controlled by an electrical controller 44 responsive to the occupant's voice or to signals produced by a control wand supported on the armrest (not shown) of the wheelchair. The armrest could be an integral part of the wheelchair seat assembly.

Figure 3:
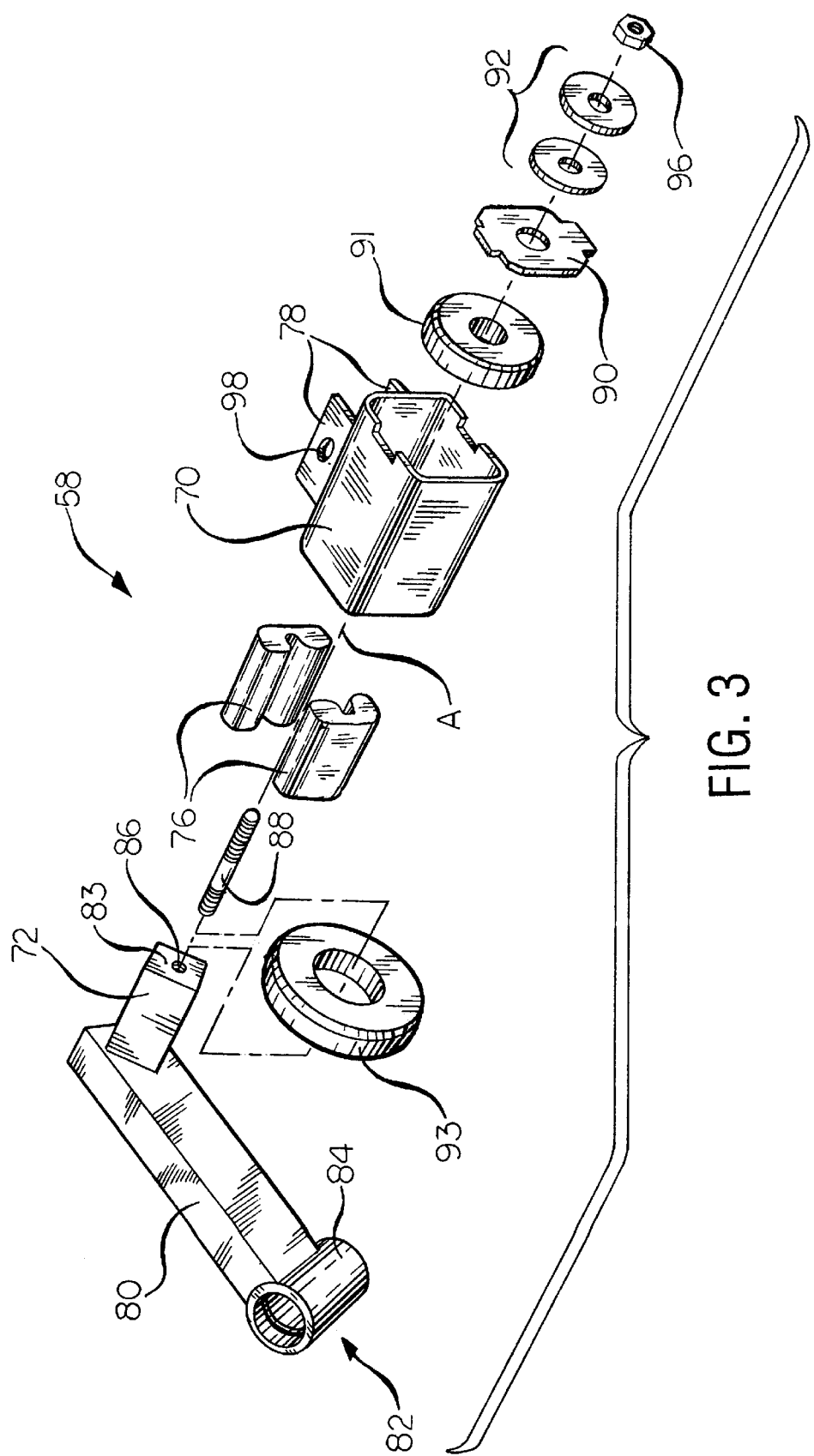
FIG. 3 is an exploded perspective view of a resilient rear suspension member of the invention.
Figure 4:
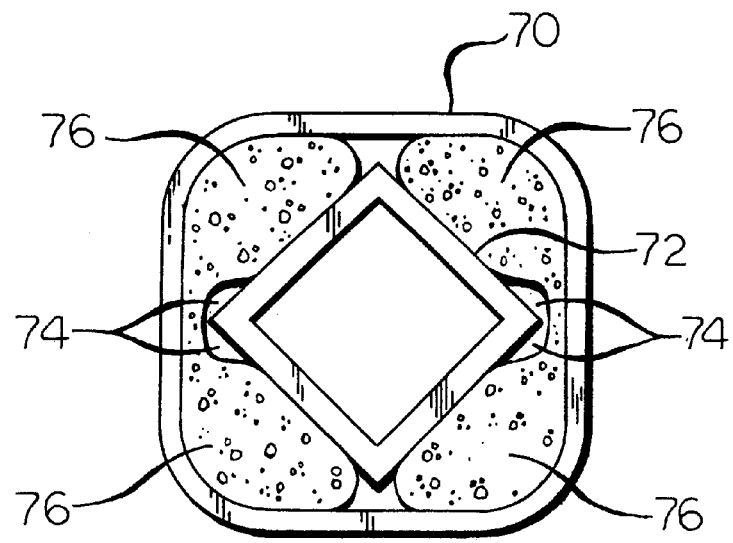
FIG. 4 is an enlarged sectional view of a portion of the resilient rear suspension member shown in FIG. 3.

An example of a resilient suspension member is shown in FIG. 3. Although the resilient suspension member shown is a resilient rear suspension member 58, the resilient front suspension member 56 is configured in a similar manner. The resilient rear suspension member 58 includes an outer structural member 70 and an inner structural member 72 disposed within the outer structural member 70. It is preferable that the outer structural member 70 and the inner structural member 72 be metal. However, it is conceivable that other materials may be suitable for carrying out the invention. Although the outer structural member 70 and the inner structural member 72 are substantially square, other geometric shapes may be employed. As shown in FIG. 4, the outer structural member 70 is positioned out of phase relative to the inner structural member 72 so as to form a plurality of pockets 74 between the outer structural member 70 and the inner structural member 72. Although the outer structural member 70 is positioned forty-five degrees out of phase relative to the inner structural member 72, other phase angles may be suitable for carrying out the invention. The relative positions of the outer structural member 70 and the inner structural member 72 may largely depend on the geometric shapes of the structural members 70, 72. A resilient element 76 is disposed within each of the pockets 74. The resilient element 76 is preferably an elastomeric material. Rubber or vulcanized rubber may be a suitable material. It should be understood that the resilient element 76 may be a natural or synthetic material. Urethanes or other polymers may be suitable for carrying out the invention. The inner structural member 72 is rotatable relative to the outer structural member 70 along an axis of rotation, indicated at A in FIG. 7. The resistance of the resilient element 76 to compression limits the rotation or torsional movement of the inner structural member 72.

As shown in FIG. 3, a set of spaced apart tabs, generally indicated at 78, extends from an outer surface of the outer structural member 70. The tabs 78 are provided to engage the rear end 38 of the lower frame structure 22, as is clearly shown in FIG. 2. The tabs 78 have holes 98 which co-align with corresponding holes (not shown) in the rear end 38 of the lower frame structure 22 to receive a fastener (not shown) for affixing the outer structural member 70 to the base frame assembly 10. The resilient front suspension member 56 may be attached to the front end 16 of the base frame assembly 10, as shown in FIG. 7, in a similar manner as well.

Continuing with reference to FIG. 3, a lever 80 is shown attached to the inner structural member 72. The lever 80 is provided for supporting the rear wheel 64 (shown in FIG. 2). The rear wheel 64 is supported at an end 82 of the lever 80 remote from the inner structural member 72. The lever 80 may support the rear wheel 64 in any conventional manner. For example, a caster housing 84 may be provided at the end 82 of the lever 80 for rotatably receiving a caster stem (not shown). An annular space (not shown) may be defined between an inner surface of the housing 84 and the caster stem to receive bearings (also not shown).

An end 83 of the inner structural member 72 remote from the lever 80 has a threaded bore 86 for receiving a threaded stud 88. The threaded stud 88 extends through a cap 90 for the outer structural member 70, and further through a series of washers 92. A lock nut 96 is engageable with the threaded stud 88 so as to confine the outer structural member 70 between the lever 80 and the cap 90. Linear bearings 91, 93 may be employed between the lever 80 and the structural members 70, 72, and further between the inner structural member 72 and the cap 90 to eliminate or reduce axial frictional forces. It should be understood that other friction reduction elements, such as nylon washers (not shown), may be employed as well.

It should be noted with reference to FIG. 7, that the resilient front suspension members 56 and the resilient rear suspension members 58 are attached to the base frame assembly 10 at different relative elevations. It should also be noted that the lengths of the levers 80, 81 and the angular displacement of the levers 80, 81 vary between the resilient front suspension members 56 and the resilient rear suspension members 58. It should further be noted that the front wheels 62 and the rear wheels 64 may be of different dimensions. These characteristics are dependent on one another and may be largely dependent on other physical characteristics of the wheelchair as well.

Unlike the resilient rear suspension members 58, the resilient front suspension members 56 each supports a traction ramp 100. The traction ramps 100 are preferably welded to the resilient front suspension members 56. However, it should be understood that the traction ramps 100 may be attached in any suitable manner.

Figure 5:
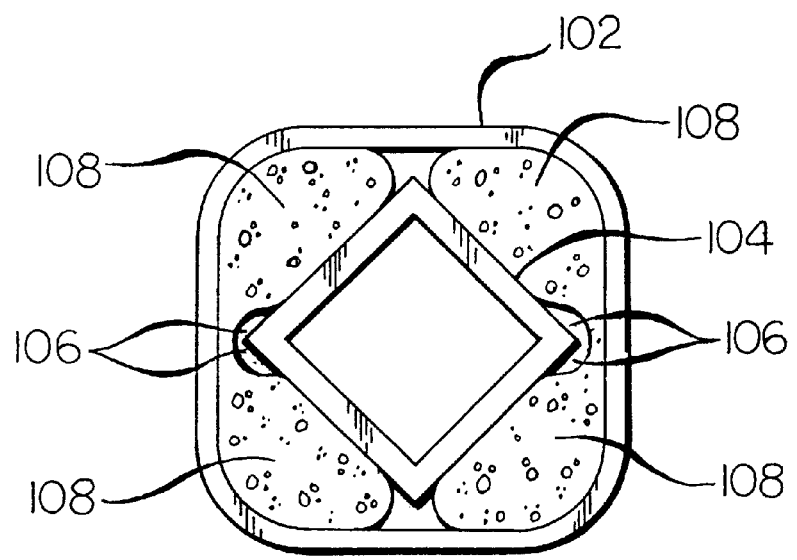
FIG. 5 is an enlarged sectional view of a portion of a resilient drive wheel suspension member of the invention.
Figure 8:
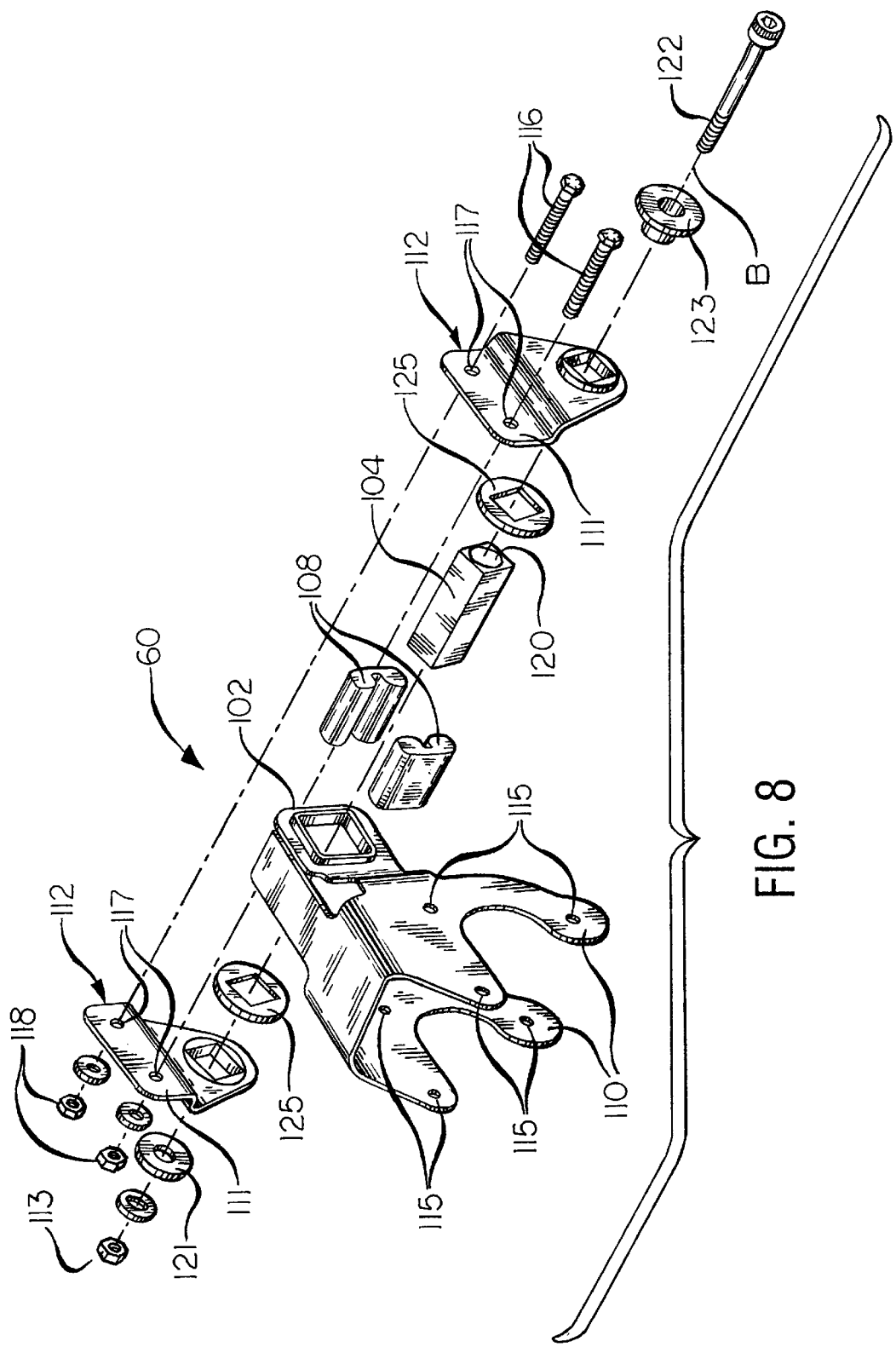
FIG. 8 is an exploded perspective view of the resilient drive wheel suspension member shown in FIGS. 2, 6, and 7.

The resilient drive wheel suspension members 60 are configured in a manner similar to that of the resilient rear suspension members 58 and the resilient front suspension members 56. As shown in FIG. 8, the resilient drive wheel suspension members 60 each includes an outer structural member 102 and an inner structural member 104 disposed within the outer structural member 102. A plurality of pockets 106 (more clearly shown in FIG. 5) are defined between the outer structural member 102 and the inner structural member 104. A resilient element 108 is disposed within each of the pockets 106 (also shown more clearly in FIG. 5). The resilient element 108 is preferably an elastomeric material. As set forth above, the resilient element 108 may be rubber or vulcanized rubber. The resilient element 108 may be a natural or synthetic material. Urethane or other polymers may be suitable for carrying out the invention. The inner structural member 104 is rotatable relative to the outer structural member 102 along an axis of rotation, indicated at B in FIG. 7, and the resistance of the resilient element 108 to compression limits such rotation.

A set of spaced apart tabs, generally indicated at 110, extends from the outer structural member 102. The tabs 110 are provided to support the electric motor assembly 68. Hence, the tabs 110 define a motor mount. The tabs 110 have holes 115 that co-align with corresponding holes (not shown) in the electric motor assembly 68 (shown in FIG. 2) and are adapted to receive fasteners (not shown) for affixing the electric motor assembly 68 to the tabs 110.

Figure 6:
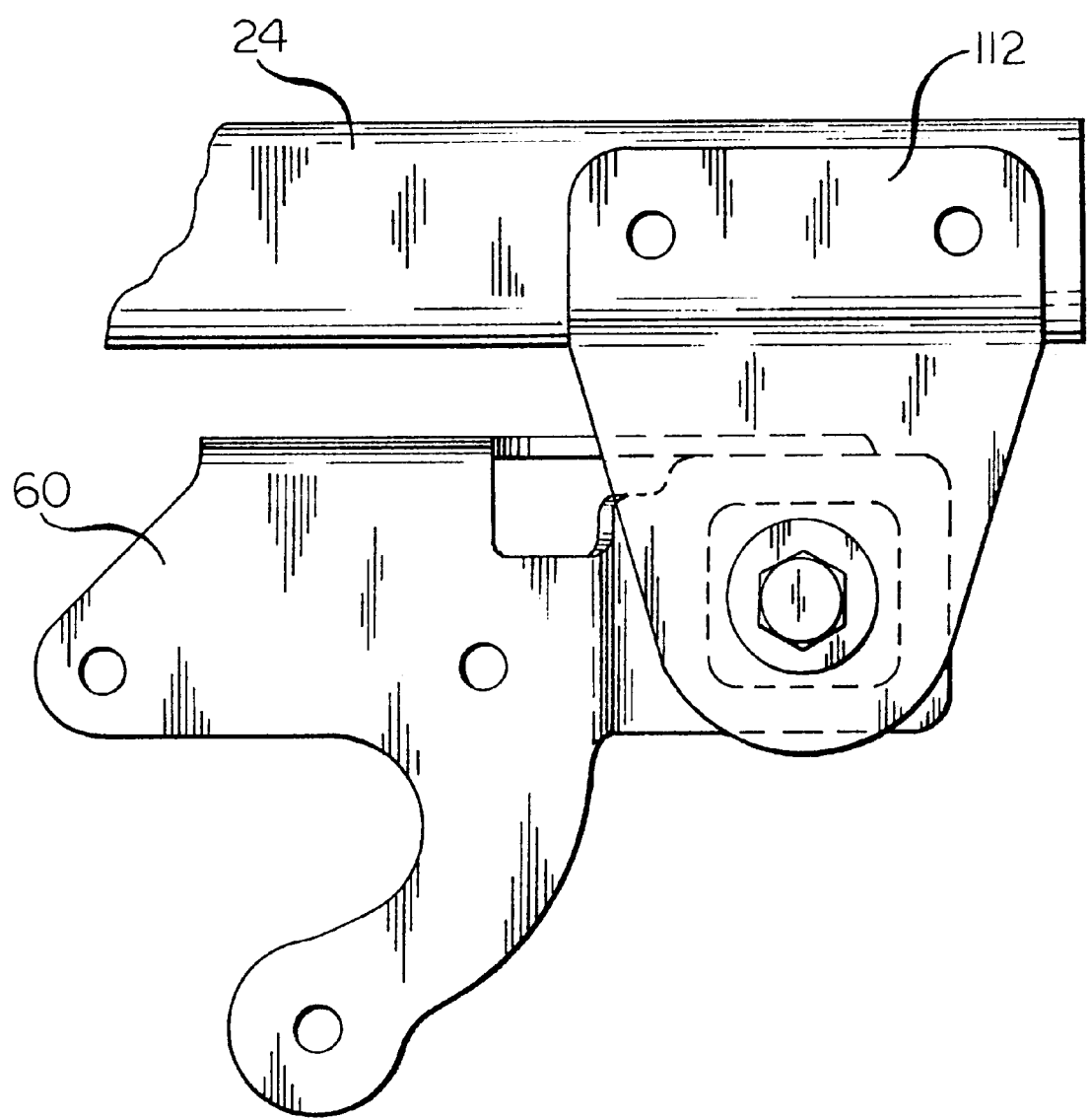
FIG. 6 is an enlarged side elevational view of the resilient drive wheel suspension member shown in FIG. 2 attached to a portion of the side of the base frame assembly.

The outer structural member 102 is disposed between two spaced apart brackets 112. Spacers may be provided between the inner structural member 104 and the brackets 112 so as to center the outer structural member 102 between the brackets 112. The brackets 112 shown are triangular shaped and have an offset upper end 111. The offset upper end 111 is provided to compensate for the difference in the axial width of the outer structural member 102 and the sides 24, 28 of the upper frame structure 20 of the base frame assembly 10 to which the brackets 112 attach. The offset upper end 111 of each of the brackets 112 have holes 117 that co-align with holes (not shown) in the opposite sides 24, 28 of the upper frame structure 20. Threaded fasteners 116 pass through the holes 117 in the brackets 112 and further through the holes in the sides 24, 28 of the upper frame structure 20. The threaded fasteners 116 are engageable with lock nuts 118 to attach the brackets 112 to the upper frame structure 20 (as shown in FIG. 6).

An axial bore 120 passes through the inner structural member 104. A threaded fastener 122 passes through the brackets 112, the inner structural member 104, and a series of washers 121, 123 and spacers 125. A lock nut 113 engages the threaded fastener 122 to retain the outer structural member 102 within the inner structural member 104 and between the brackets 112.

The resilient elements 76, 108 set forth above each preferably have a cross-section larger than the cross-section of the pockets 74, 106 so as to be compressed when in the pockets 74, 106. The resilient elements 76, 108 may be formed integrally with one another, as shown in the drawings, or may be separate cylindrically shaped resilient members (not shown) independent of one another. Resilient elements 76, 108 formed integrally with one another may be more effective in restricting the rotational displacement of the inner structural members 72, 104 relative to the outer structural members 70, 102.

It should be understood that the invention is not limited to resilient elements that are an extruded elastomer. An elastomer may be injected into the pockets 74, 106. An injected elastomer would bond to the outer structural members 70, 102 as well as the inner structural members 72, 104.

Figure 9:
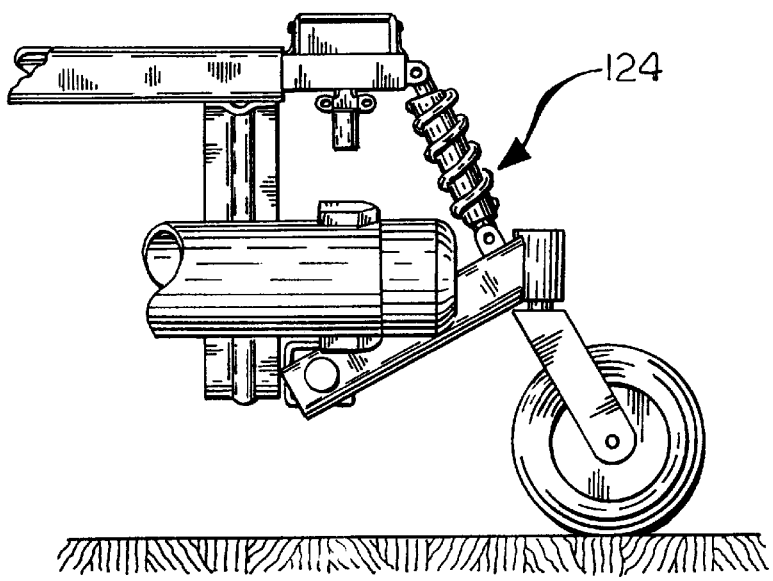
FIG. 9 is an elevational view of another alternative resilient element.
Figure 10:
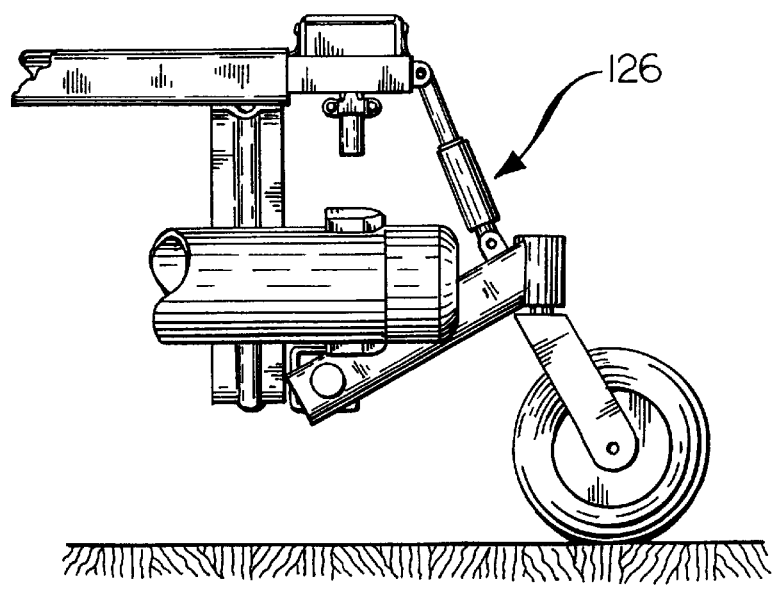
FIG. 10 is an elevational view of yet another alternative resilient element.
Figure 11:
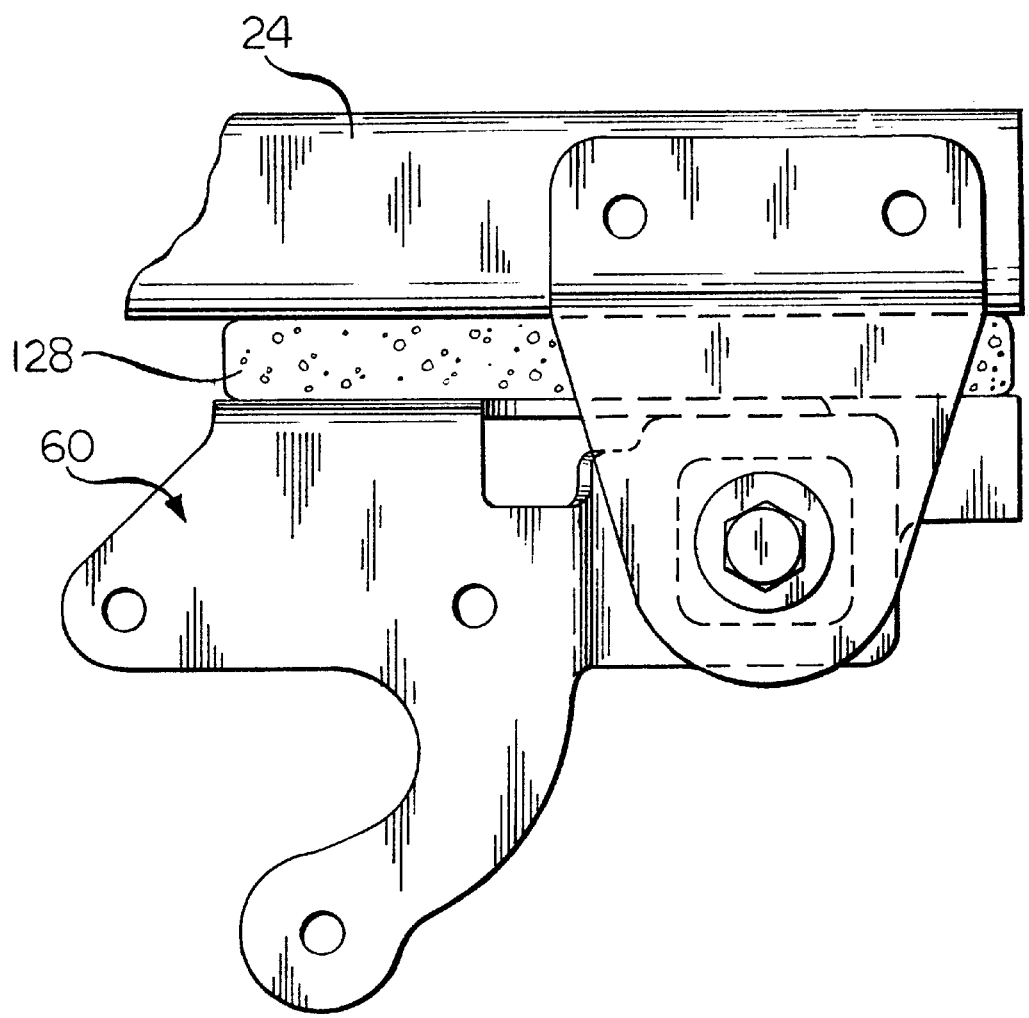
FIG. 11 is an elevational view of still another alternative resilient element.

It should also be understood that the resilient suspension members in the foregoing description are merely illustrative and that other resilient suspension configurations may be suitable for carrying out the invention. For example, an annular resilient element may be provided in an annular pocket defined between cylindrical inner and outer structural members. The annular resilient element may be in the form of a Torsilastic spring manufactured by B F Goodrich in Akron, Ohio. A resilient element in the form of a spring 124 is shown in FIG. 9. A resilient member in the form of a hydraulic actuator 126 is shown in FIG. 10. FIG. 11 shows a resilient material 128 intermediate a displaceable structural member, such as the resilient drive wheel suspension member 60, and a fixed structural member, such as one of the sides 24 of the upper frame structure 20 of the base frame assembly 10. Each of these configurations may be suitable for carrying out the invention.

Figure 12:
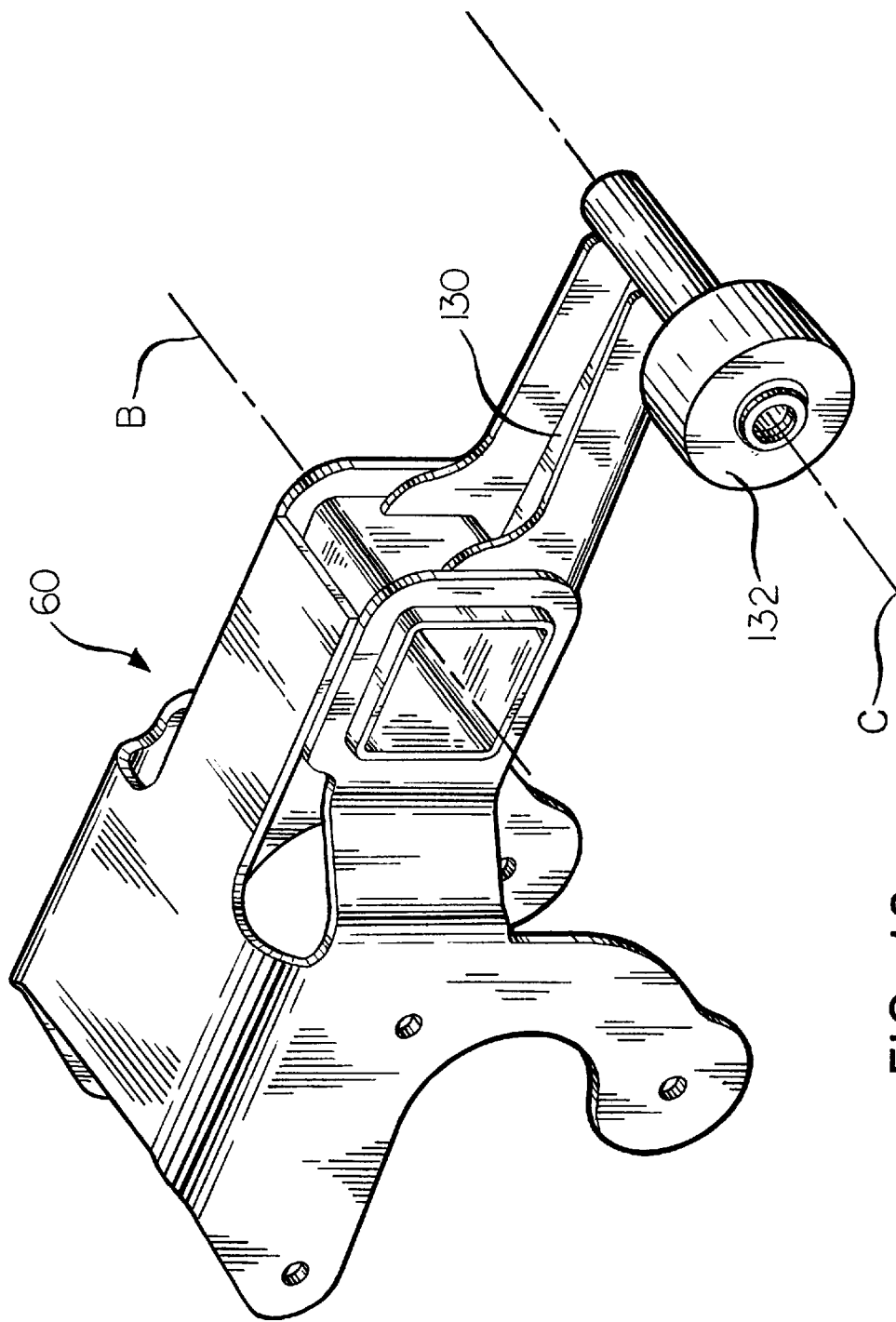
FIG. 12 is a perspective view of an alternative resilient drive wheel suspension member.

As shown in FIG. 12, the resilient drive wheel suspension members 60 may be provided with a traction link arm 130 for supporting a traction link roller 132. The traction link roller 132 is rotatable about an axis of rotation C that is spaced apart and substantially parallel to the axis of rotation B of the resilient drive wheel suspension member 60. The traction link roller 132 is adapted to cooperate with or engage the traction ramp 100. The traction link arm 130, the traction link roller 132, and the traction ramp 100 cooperatively form a traction linkage assembly, generally indicated at 134 (shown in FIG. 7). The traction linkage assembly 134 insures that a continuous contact is maintained between the drive wheels 66 and the ground.

The operation of the suspension system will be best understood with reference to FIG. 7. As the wheels 62, 64, 66 rotate in the direction of the arrows D, the wheelchair progresses forward in the direction of the arrow E. The resilient suspension members 56, 58, 60 absorb shock sustained by the wheelchair when traversing an irregular ground surface to provide comfortable transportation. This is accomplished because of the compressive and decompressive nature of the resilient elements 76, 108. The front wheels 62 are spaced apart from the drive wheels 66 sufficiently to reduce the risk of the wheelchair tipping forward. Likewise, the rear wheels 64 are spaced apart from the drive wheels 66 sufficiently to reduce the risk of the wheelchair tipping rearward. Note that clearance is provided between the traction link roller 132 and the traction ramp 100. As the wheelchair encounters an obstacle, the resilient front suspension members 56 pivot about an axis of rotation in the direction of the arrow F. As this occurs, the resilient front suspension members 56 approach the traction link rollers 132. Upon contacting the traction ramps 100, the traction link rollers 132 progress up the traction ramps 100 and the resilient drive wheel suspension members 60 pivot about the axis of rotation B in the direction of the arrow G. As this occurs, the drive wheels 66 are forced downward so as to remain in contact with the ground. As the wheelchair tips rearward, the rear wheels 64 maintain contact with the ground. The resilient rear suspension members 58 may pivot about the axis of rotation A in the direction of the arrow H so as to absorb shock encountered by rearward tipping. Upon overcoming the obstacle, the resilient suspension members 56, 58, 60 return to a normal position. It should be understood that, as the wheelchair tips rearward, the resilient elements 76, 108 are compressed. As the wheelchair overcomes the obstacle, the resilient elements 76, 108 are decompressed. The resistance to compression increases as the compression increases so as to smoothly absorb shock or abrupt jolts. Likewise, the resistance to compression decreases as the resilient elements 76, 108 decompress to smoothly urge the resilient suspension members 56, 58, 60 back to a normal position.

It should be clear that the front wheels 62 reduce the risk of the wheelchair tilting forward. The resilient rear suspension members 58 function to support anti-tip wheels to limit the amount of rearward tipping of the wheelchair.

A separate and independent resilient suspension member for each wheel permits each of the six wheels to react to irregular ground surfaces independent of all the other wheels. However, it is to be understood that an independent resilient suspension member need not be provided for all of the wheels. For example, independent resilient suspension members may be provided for the front wheels 62 only. However, such a configuration would not permit the drive wheels 66 to pivot. It should also be understood that a resilient suspension member may be provided to support a single wheel, like a single front wheel 62 or a single rear wheel 64. One advantage to having six wheels is that the drive wheels 66 may be centrally located along the opposite sides 12, 14 of the base frame assembly 10 between the front and rear wheels 62, 64.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A resilient suspension system for a wheelchair having a frame, said system comprising:

a drive wheel;

a front wheel; and a suspension including a drive wheel suspension member for supporting said drive wheel and a front wheel suspension member for supporting said front wheel, said drive wheel suspension member and said front wheel suspension member each adapted to be movably attached to the wheelchair frame, each said suspension member cooperating with a resilient element to resist movement of said suspension members relative to the frame, said suspension members being adapted to engage each other in response to movement of said suspension members.

2. The suspension system according to claim 1, further including a rear wheel suspension member for supporting a rear wheel, said rear wheel suspension member being adapted to be movably attached to the wheelchair frame rearward of said drive wheel suspension member, said rear wheel suspension member cooperating with a resilient element to resist movement of said rear wheel suspension member relative to the frame.

3. The suspension system according to claim 1, wherein said resilient elements are elastomeric elements.

4. The suspension system according to claim 1, wherein said drive wheel suspension member includes a roller that is adapted to engage said front wheel suspension member.

5. The suspension system according to claim 4, wherein said front wheel suspension member includes a ramp, said roller being adapted to engage said ramp.

6. The suspension system according to claim 1, wherein said front wheel suspension member includes a ramp, said drive wheel suspension member being adapted to engage said ramp.

7. A wheelchair comprising:

a frame, and a suspension including:

a pair of drive wheel suspension members movably attached to opposing sides of said frame; and a pair of front wheel suspension members movably attached to said frame in front of said drive wheel suspension members, each said suspension member cooperating with a resilient element to resist movement of said suspension members, each said drive wheel suspension member further including a forwardly extending portion which is adapted to engage a respective one of said front wheel suspension members in response to movement of said suspension members.

8. The suspension system according to claim 7, further including a pair of rear wheel suspension members movably attached to said frame rearward of said drive wheel suspension members, each said rear wheel suspension member cooperating with a resilient element to resist movement of said rear wheel suspension members relative to said frame.

9. The suspension system according to claim 7, wherein said resilient elements are elastomeric elements.

10. The suspension system according to claim 7, wherein each said drive wheel suspension member includes a roller that is adapted to engage a respective one of said front wheel suspension members.

11. The suspension system according to claim 10, wherein each said front wheel suspension member includes a ramp, each said roller being engageable with a respective one of said ramps.

12. The suspension system according to claim 7, wherein each said front wheel suspension member includes a ramp, each said drive wheel suspension member being adapted to engage a respective one of said ramps.

13. A wheelchair comprising:

a frame;

a pair of drive wheel suspension members each movably attached to opposing sides of said frame and each cooperating with a resilient element to resist movement of said drive wheel suspension members;

a pair of front wheel suspension members each movably attached to said frame in front of said drive wheel suspension members and each cooperating with a resilient element to resist movement of said front wheel suspension members, wherein said suspension members are adapted to engage one another in response to movement of said suspension members relative to said frame; and a pair of rear wheel suspension members each movably attached to said wheelchair frame rearward of said drive wheel suspension members, each said rear wheel suspension members cooperating with a resilient element to resist movement of said rear wheel suspension members relative to said frame.

14. The suspension system according to claim 13, wherein said resilient elements are elastomeric elements.

15. The suspension system according to claim 13, wherein each said drive wheel suspension member includes a roller that is adapted to engage a respective one of said front wheel suspension members.

16. The suspension system according to claim 15, wherein each said front wheel suspension member includes a ramp, each said roller being engageable with a respective one of said ramps.

17. The suspension system according to claim 13, wherein each said front wheel suspension member includes a ramp, each said drive wheel suspension member being adapted to engage a respective one of said ramps.

* * * * *